(12) United States Patent
Xu et al.

(10) Patent No.: US 12,491,781 B2
(45) Date of Patent: Dec. 9, 2025

(54) CHARGING APPARATUS

(71) Applicant: Guochuang Innovation Center of Mobile Energy (Jiangsu) Co.,Ltd., Jiangsu (CN)

(72) Inventors: Lixiong Xu, Jiangsu (CN); Jianghui Yuan, Jiangsu (CN); Linyu Jiang, Jiangsu (CN); Chengfei Zhang, Jiangsu (CN); Ming Li, Jiangsu (CN); Ao Zhou, Jiangsu (CN)

(73) Assignee: Gouchuang Innovation Center of Mobile Energy (Jiangsu) Co., Ltd., Jiangsu (CN)

( * ) Notice: Subject to any disclaimer, the term of this patent is extended or adjusted under 35 U.S.C. 154(b) by 818 days.

(21) Appl. No.: 17/865,343

(22) Filed: Jul. 14, 2022

(65) Prior Publication Data

US 2023/0098461 A1    Mar. 30, 2023

(30) Foreign Application Priority Data

Sep. 30, 2021  (CN) .......................... 202111156002.6

(51) Int. Cl.
*H02J 7/00* (2006.01)
*B60L 53/31* (2019.01)
*B60L 53/35* (2019.01)

(52) U.S. Cl.
CPC .............. *B60L 53/31* (2019.02); *B60L 53/35* (2019.02)

(58) Field of Classification Search
USPC ........................................................ 320/109
See application file for complete search history.

(56) References Cited

U.S. PATENT DOCUMENTS 11,110,812 B2 *   9/2021   Miller .................... B60L 53/126
2019/0367334 A1 * 12/2019   Maier ..................... B66C 13/12

FOREIGN PATENT DOCUMENTS

| CN | 2435270 | | 6/2001 |
| CN | 206983779 U | * | 2/2018 |
| CN | 209409846 | | 9/2019 |

OTHER PUBLICATIONS

"Office Action of China Priority Application, Application No. 202111156002.6", with English translation thereof, issued on Nov. 10, 2021, p. 1-p. 8.

* cited by examiner

*Primary Examiner* — Samuel Berhanu
(74) *Attorney, Agent, or Firm* — JCIPRNET

(57) ABSTRACT

The disclosure relates to the technical field of charging, and in particular, relates to a charging apparatus. A charging apparatus includes a support unit; a charging bow lifted and assembled on the support unit; a retractable mechanism, where the retractable mechanism retracts a cable, and a free end of the cable pulls the charging bow up and down; and a straining member assembled on a mounting point of the cable near the free end. After the charging bow is docked with a pantograph, the retractable mechanism continues to release the cable to relax the cable. Under the action of the straining member, the cable between the mounting point and the retractable mechanism is in a strained state, and the cable between the mounting point and the charging bow forms a cable slack section.

12 Claims, 17 Drawing Sheets

CHARGING APPARATUS

CROSS-REFERENCE TO RELATED APPLICATION

This application claims the priority benefit of China application serial no. 202111156002.6, filed on Sep. 30, 2021. The entirety of the above-mentioned patent application is hereby incorporated by reference herein and made a part of this specification.

BACKGROUND

Technical Field

The disclosure relates to the technical field of charging, and in particular, to a charging apparatus.

Description of Related Art

In recent years, along with the rapid advancement of electric buses, the charging bows for high-power DC charging have developed rapidly. When charging a charging bow, there are certain requirements for the crimping force between the bow head electric row and the vehicle end electric row because an excessively large crimping force is not good for the vehicle roof, and an excessively small crimping force may result in unstable lapping, leading to arcing and sparking.

The lifting and driving mechanism of a charging bow provided by the related art includes the form of a motor with a connecting rod, a motor with a screw rod, a motor with a rigid chain, or a direct electric cylinder. However, these driving forms are all rigid driving, and the crimping forms are all rigid crimping. Although the basic crimping force requirements can be met, the following problems are observed.

1. The bow head stroke of the charging bow is required to be at least 1.5 m or greater. In addition to the rigid chain mentioned above, restricted by the driving structure, the driving force acting point of the driving element is far away from the charging bow head, which belongs to the "labor lever" structure. The driving and the structure bear large force and the drive precision is low.

2. In all the above forms, due to the rigid structure, the charging bow head exhibits a poor following effect when following the floating of the vehicle and is prone to arcing and sparking due to the floating of the vehicle. Especially for a vehicle using air suspension or a vehicle with a side-tilting requirement to get passengers on and off, the floating range of the roof will be larger. Even though a bow head elastic compensation mechanism is provided, the mutual separation of the crimped electric bars still cannot be avoided, and there are potential safety hazards. There are even embarrassing scenes where after completing the charging operation command, a driver needs to get off the vehicle very carefully.

SUMMARY

In view of the technical problems in the prior art that when a charging bow is rigidly driven and rigidly crimped, the mutual separation of the crimped electric bars cannot be avoided and there is a potential safety hazard, the disclosure provides a charging apparatus capable of solving the foregoing technical problems. The disclosure includes the following technical solutions.

The disclosure provides a charging apparatus including a support unit, a charging bow, a retractable mechanism, and a straining member.

The charging bow is lifted and assembled on the support unit.

The retractable mechanism retracts a cable, and a free end of the cable pulls the charging bow up and down.

The straining member is assembled on a mounting point of the cable near the free end. After the charging bow is docked with a pantograph, the retractable mechanism continues to release the cable to relax the cable. Under the action of the straining member, the cable between the mounting point and the retractable mechanism is in a strained state, and the cable between the mounting point and the charging bow forms a cable slack section.

According to an embodiment of the disclosure, the straining member includes an elastic member, one end of the elastic member acts on the mounting point, and the other end of the elastic member acts on the charging bow. Alternatively, the straining member includes a weight, and the weight is fixed at the mounting point of the cable.

According to an embodiment of the disclosure, a scissors mechanism is further included. The scissors mechanism is telescopically assembled on the support unit, a lower end of the scissors mechanism is connected to the charging bow, and the cable passes through the scissors mechanism and is connected to the charging bow.

According to an embodiment of the disclosure, a chute and a guide groove are formed on the support unit, a top end of the scissors mechanism is slidably assembled into the chute, and a cross hinge shaft of scissor rods of the scissors mechanism compresses or extends along the guide groove.

According to an embodiment of the disclosure, at least two cables are provided, and the free end of each of the cables is connected to the charging bow through a tensioning mechanism. The tensioning mechanism includes a tensioning seat, an adjusting screw, a locking member, and a steering seat.

The tensioning seat is fixedly assembled on the charging bow.

The adjusting screw is arranged for the cable. The adjusting screw is threadedly assembled on the tensioning seat, and the adjusting screw is fixedly connected to the free end of the cable.

The locking member is configured to lock the position of the adjusting screw on the tensioning seat.

The steering seat is fixedly assembled on the charging bow. A steering shaft is disposed on the steering seat, and the cable is connected to the adjusting screw after changing direction through the steering shaft.

According to an embodiment of the disclosure, the charging bow includes a bow head assembly and a flexible swaying unit, and the bow head assembly is connected onto the cable through the flexible swaying unit.

According to an embodiment of the disclosure, the flexible swaying unit includes a first swaying member and a second swaying member. The first swaying member is hinged to a tail end of the scissors mechanism, and the second swaying member is hinged to the first swaying member. A swaying centerline of the first swaying member relative to the scissors mechanism and a swaying centerline of the second swaying member relative to the first swaying member are perpendicular to each other.

According to an embodiment of the disclosure, a first elastic assembly is formed between the scissors mechanism and the charging bow, and the first elastic assembly is symmetrically arranged with respect to the scissors mechanism, and/or a second elastic assembly is formed between the first swaying member and the second swaying member, and the second elastic assembly is symmetrically arranged with respect to the swaying centerline of the first swaying member relative to the second swaying member.

According to an embodiment of the disclosure, the bow head assembly is connected to the flexible swaying unit through connecting plates, and the connecting plats are located on two sides of the tail end of the scissors mechanism. Limiting grooves are formed on the connecting plates, limiting rods are formed on the scissors mechanism, and the limiting rods extend into the limiting grooves to limit a swaying angle of the bow head assembly relative to the scissors mechanism.

According to an embodiment of the disclosure, a counterweight is further included. The counterweight unit includes a counterweight member and a counterweight cable, and the counterweight member acts on the charging bow upwards through the counterweight cable.

Based on the foregoing technical solutions, the technical effects produced by the disclosure include the following.

1. In the charging apparatus provided by the disclosure, a structural form in which the cable is used as the flexible lifting power as the driving force and the gravity of the charging bow itself provides the crimping force is adopted. Since the cable is a flexible body, the free end of the cable may be directly connected to the charging bow. The force of the cable acts directly on the charging bow, which is more direct, and the force applied on driving and the force applied on structural parts are smaller, and the driving precision is higher. In addition, after the charging bow is docked with the pantograph, the retractable mechanism continues to release the cable to relax the cable, and the downward movement of the charging bow is not restricted due to the slack in the cable. Further, the cable is flexible rather than rigid, the upward movement of the charging bow is not restricted as well. Therefore, even if the pantograph at the vehicle end floats up and down to a large extent, under the action of gravity, the charging bow can always adapt to the up and down floating of the pantograph. The charging bow and the pantograph always keep fit, and arcing and sparking are prevented from occurring.

2. In order to avoid problems such as winding, slipping, and jamming of the cable at the retractable mechanism or the wire pulley due to the slack of the cable and thereby leading to the failure of the function of the cable, the straining member is provided. The arrangement of the straining member may concentrate the cable slack between the mounting point of the cable and the charging bow. The cable between the mounting point and the retractable mechanism is in a strained state, so there will be no winding, slipping, and jamming due to the slack of the cable. The straining member is specifically configured as an elastic member. One end of the elastic member acts on the mounting point, and the other end of the elastic member acts on the charging bow. That is, the elastic member is connected in parallel to the free end of the cable. The arrangement of the elastic member may strain the cable between the retractable mechanism and the mounting point when the cable is loose as a whole and may concentrate the slack section of the cable between the mounting point and the charging bow. The straining member may also be configured as a weight, and the weight is fixed at the mounting point of the cable. The gravitational effect of the weight may strain the cable between the retractable mechanism and the mounting point and may concentrate the slack in the cable between the mounting point and the charging bow. It can not only adapt to the up and down floating of the pantograph, but also allow the problems of winding, slipping, and jamming to be prevented from occurring.

3. In the charging apparatus provided by the disclosure, by arranging the scissors mechanism to be connected to the charging bow, the lifting direction of the scissors mechanism is restricted by the guide groove on the support unit. The scissors mechanism only drives the charging bow to be lifted and lowered in the vertical direction, and the charging bow does not translate in the front-rear and left-right directions.

4. In the charging apparatus provided by the disclosure, the tensioning mechanism is provided to tension the cable. The method of adjusting the adjusting screw may make the adjusting process convenient and accurate. Further, the tensioning mechanism may be arranged horizontally on the charging bow without occupying space in the vertical direction.

5. In the charging apparatus provided by the disclosure, the charging bow is configured to include the flexible swaying unit and the bow head assembly. The bow head assembly is connected onto the cable through the flexible swaying unit, and the flexible swaying unit may accommodate the bow head assembly to deflect in two vertical directions in the horizontal direction. In this way, when the pantograph on the vehicle has a front-rear inclination angle and/or a left-right inclination angle, the pantograph may adapt to the front-rear inclination angle and/or left-right inclination angle of the pantograph through the swaying unit. It is thus ensured that the charging bow and the pantograph are crimped in position, and the rigid pressing of the charging bow and the roof is avoided. In addition, through arrangement of the first elastic assembly and the second elastic assembly, the bow head assembly maintains a balanced state in the front-rear and left-right directions in the initial state, which facilitates the connection between the bow head assembly and the pantograph.

6. In the charging apparatus provided by the disclosure, the limiting groove is arranged on the connecting plate, and the limiting rod on the scissors mechanism extends into the limiting groove. In this way, the swaying of the bow head assembly at a certain inclination angle in the front-rear and left-right directions may be satisfied, but the swaying amplitude is not excessively large, so as to avoid interference between the structures and may further prevent the bow head assembly from being overturned.

7. In the charging apparatus provided by the disclosure, through arrangement of the counterweight unit, the counterweight member may act on the charging bow upwards through the counterweight cable, so the crimping force required by the charging bow may be easily and conveniently adjusted.

DESCRIPTION OF THE EMBODIMENTS

Figure 1:
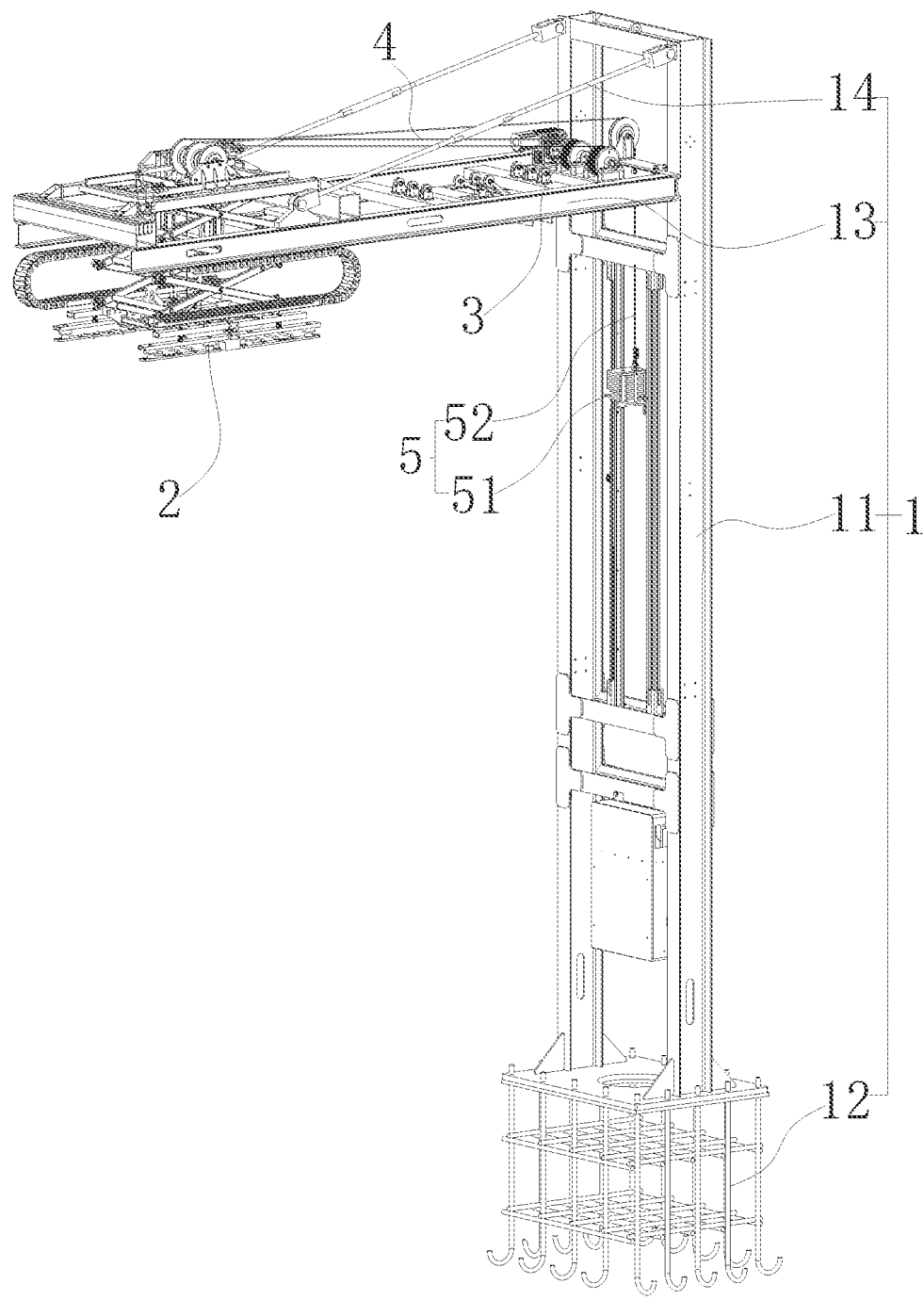
FIG. 1 is a schematic view of a structure of a charging apparatus according to the disclosure.
Figure 2:
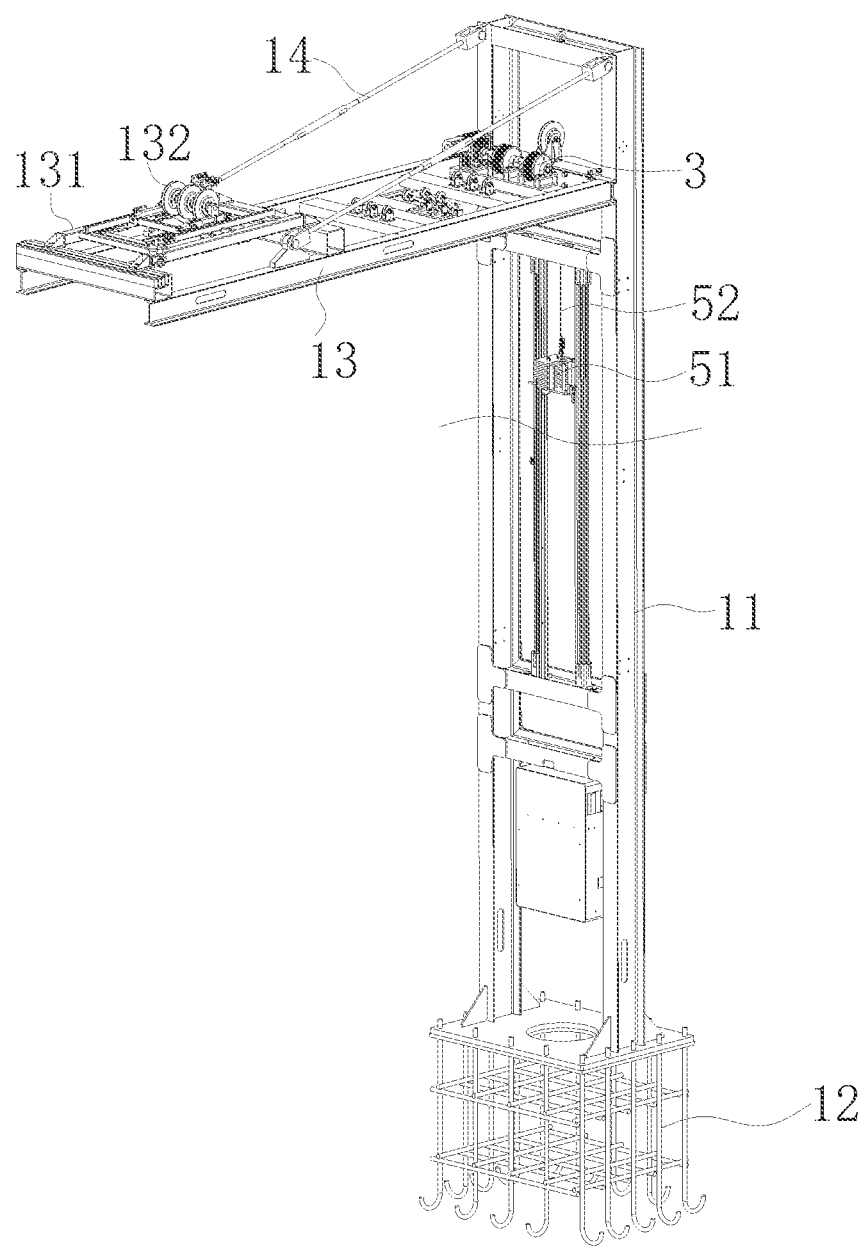
FIG. 2 is a schematic view a structure of a support unit.
Figure 3:
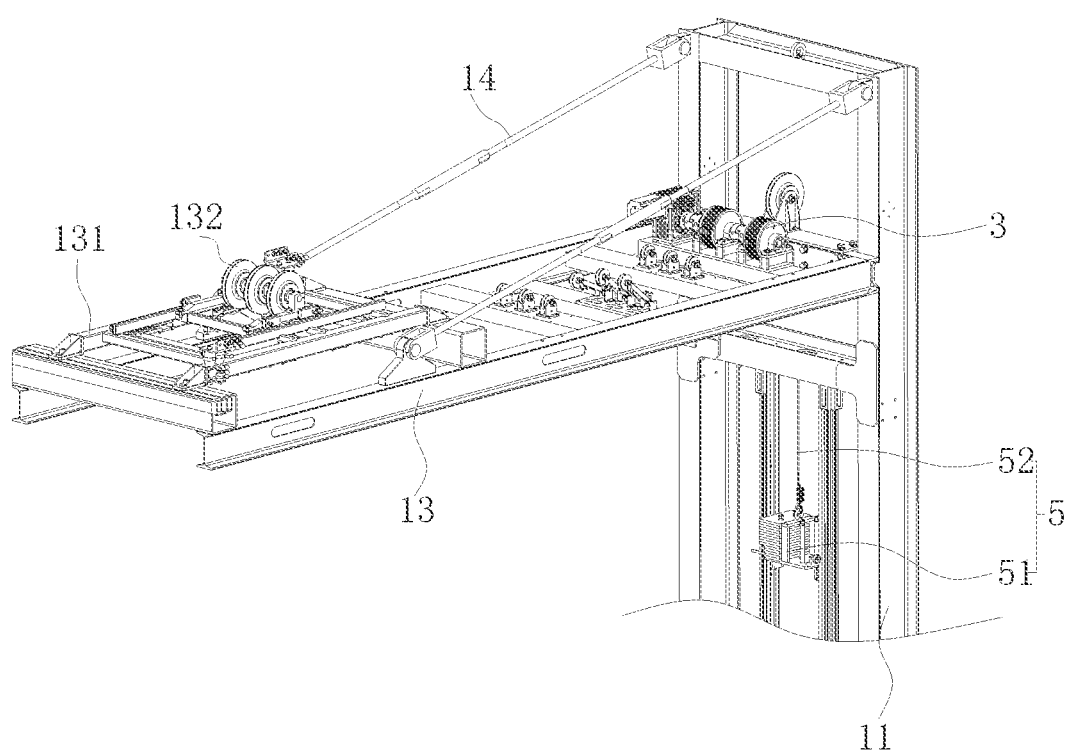
FIG. 3 is a local enlargement view of the support unit.
Figure 4:
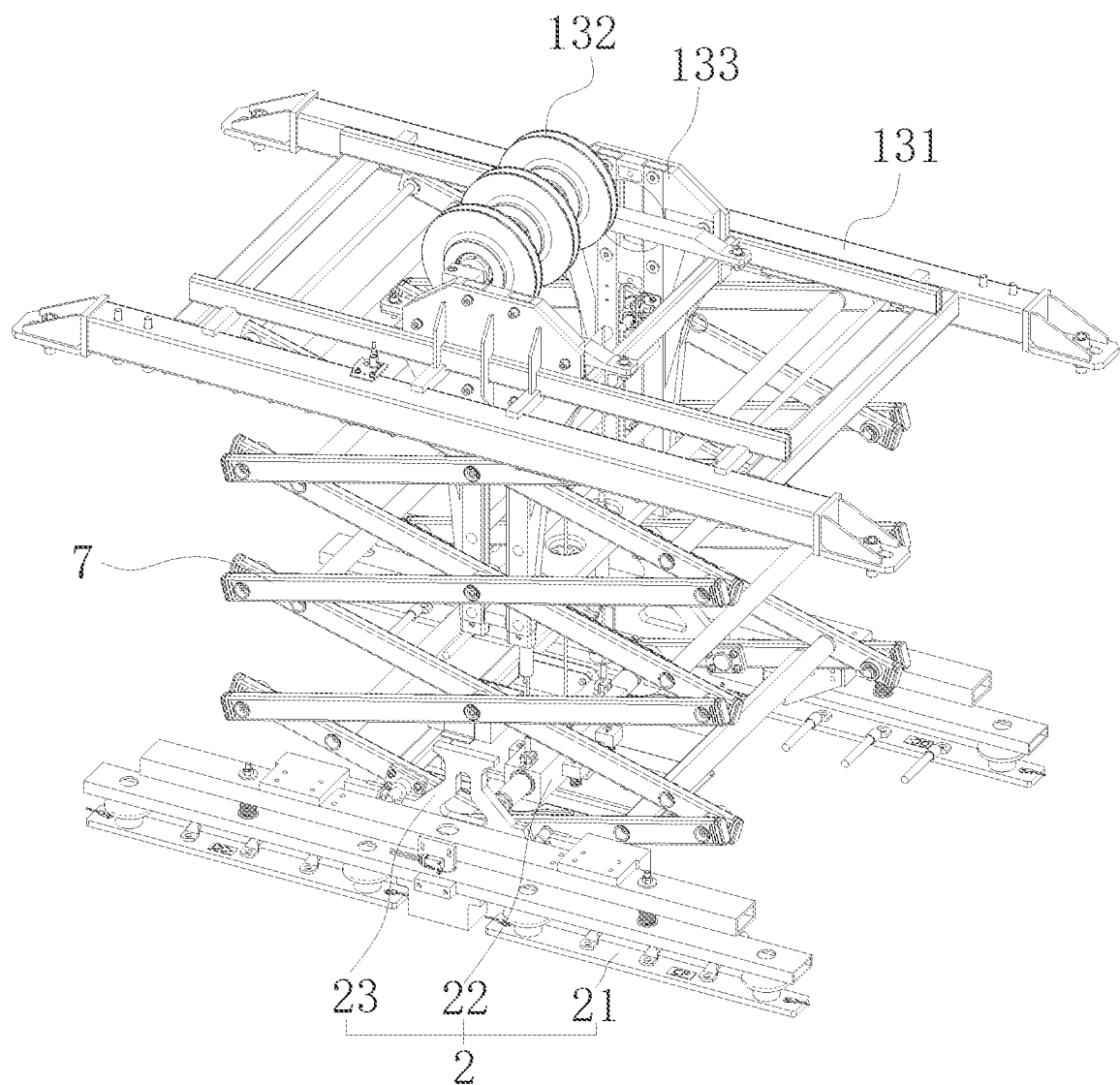
FIG. 4 is a schematic view of a structure of a charging bow assembled on a frame through a scissors mechanism and a cable.
Figure 5:
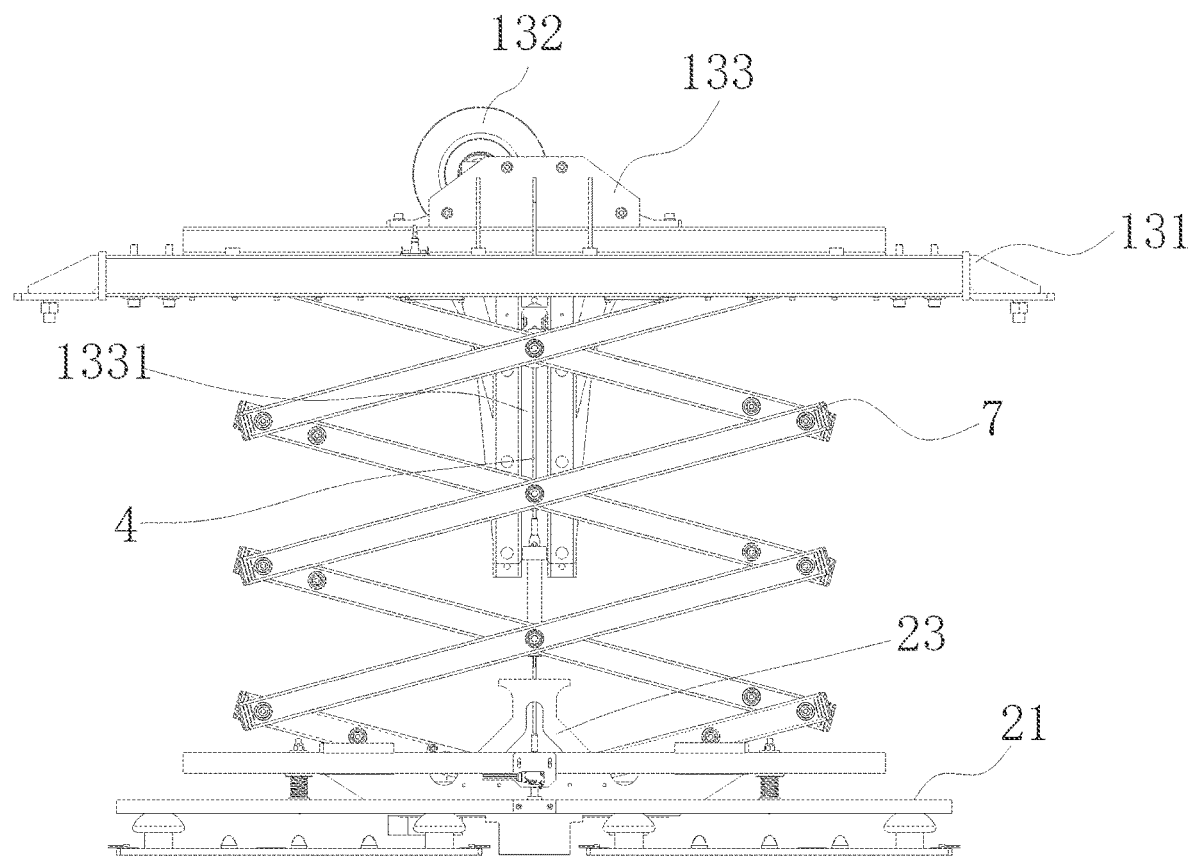
FIG. 5 is a schematic front view of the charging bow assembled on the frame through the scissors mechanism and the cable.
Figure 6:
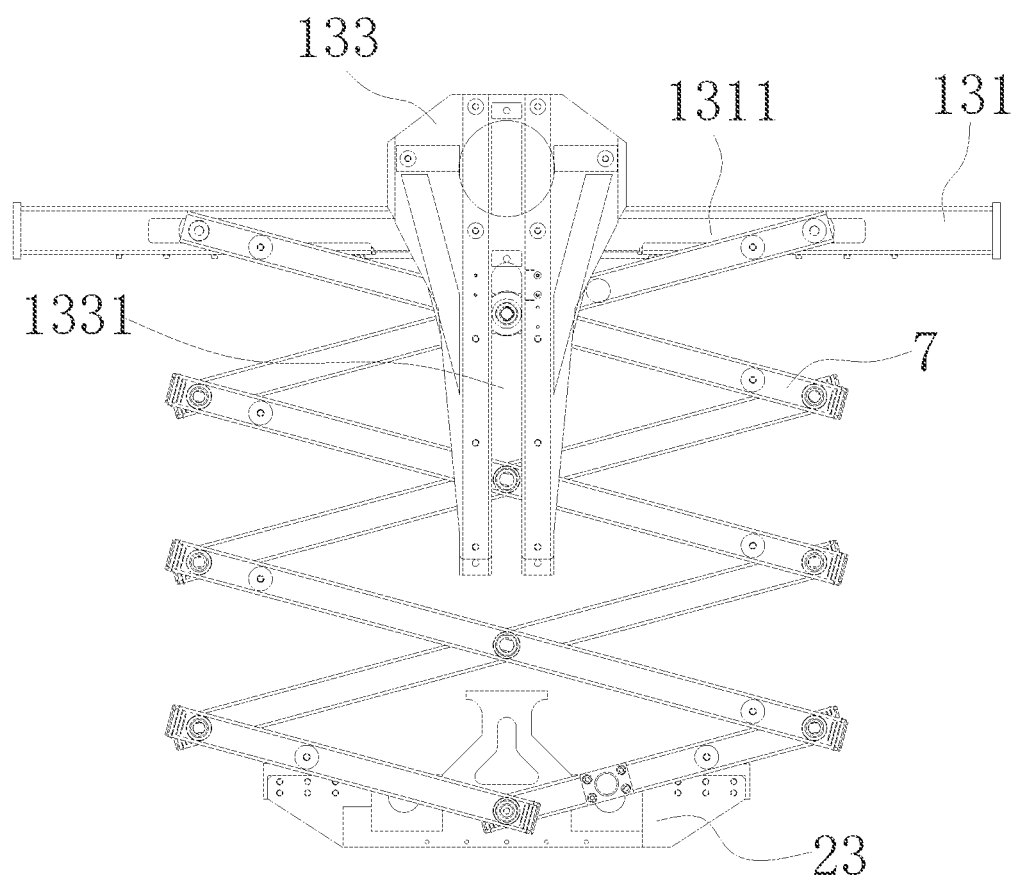
FIG. 6 is a schematic view of a structure of the scissors mechanism slidably assembled on the frame.
Figure 7:
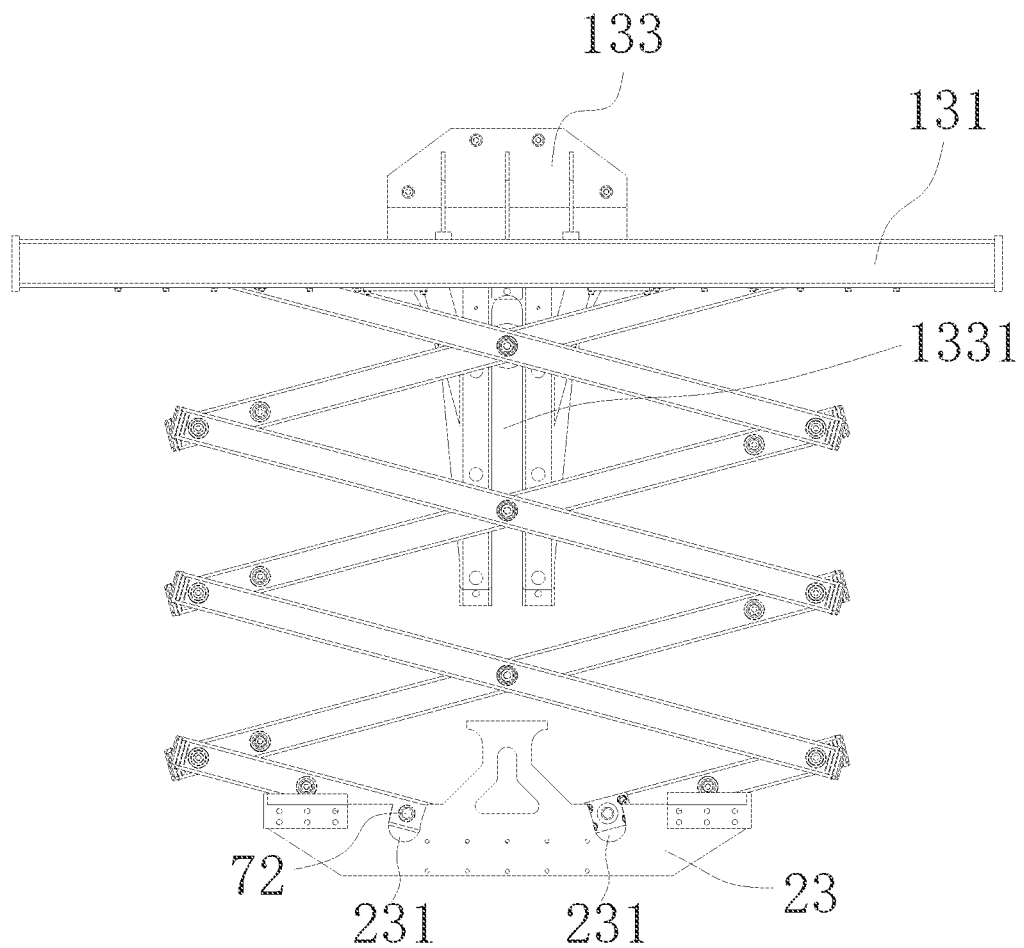
FIG. 7 is a rear view of FIG. 6.
Figure 8:
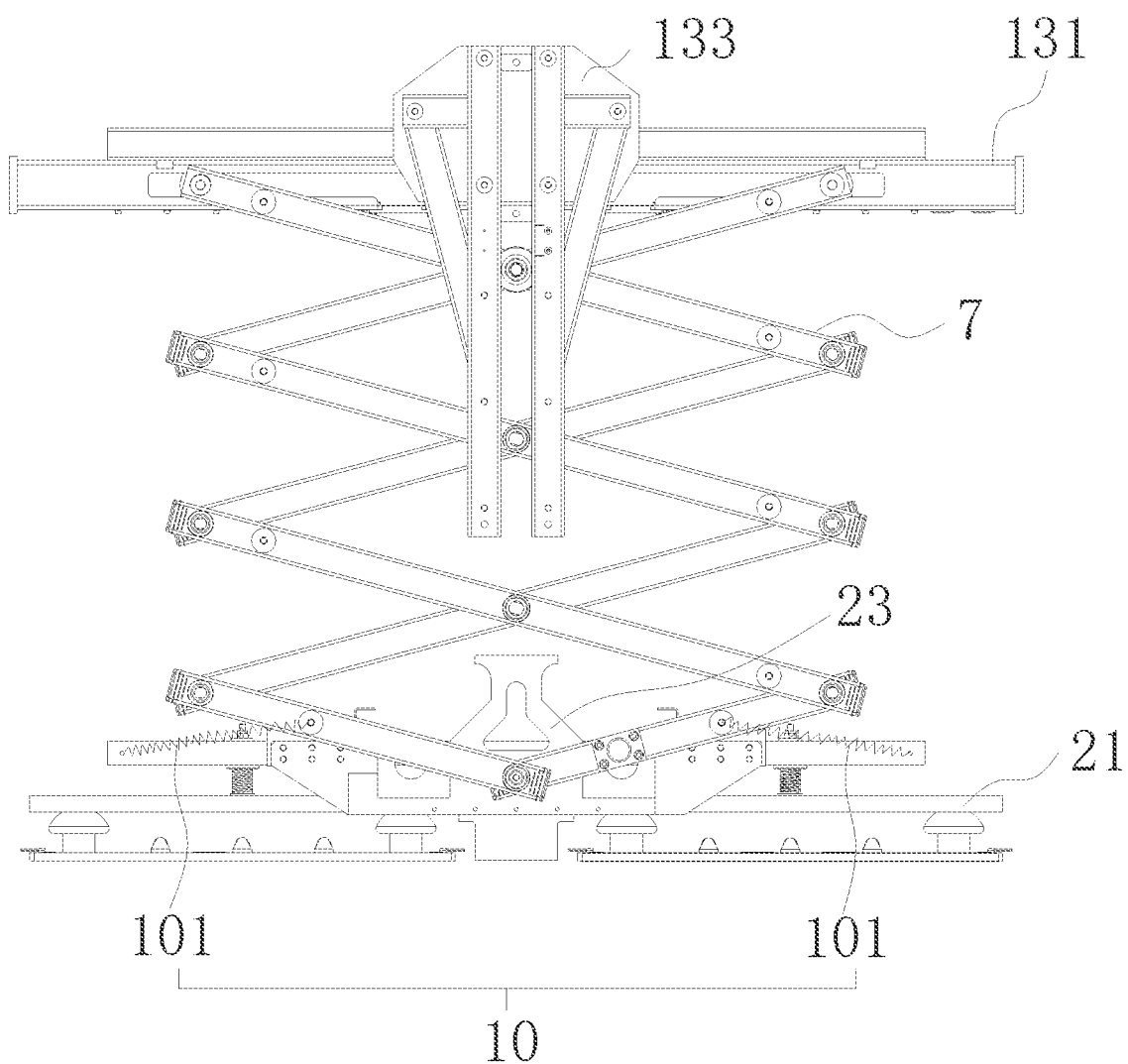
FIG. 8 is a schematic view of the structure of the scissors mechanism matched with the charging bow.
Figure 9:
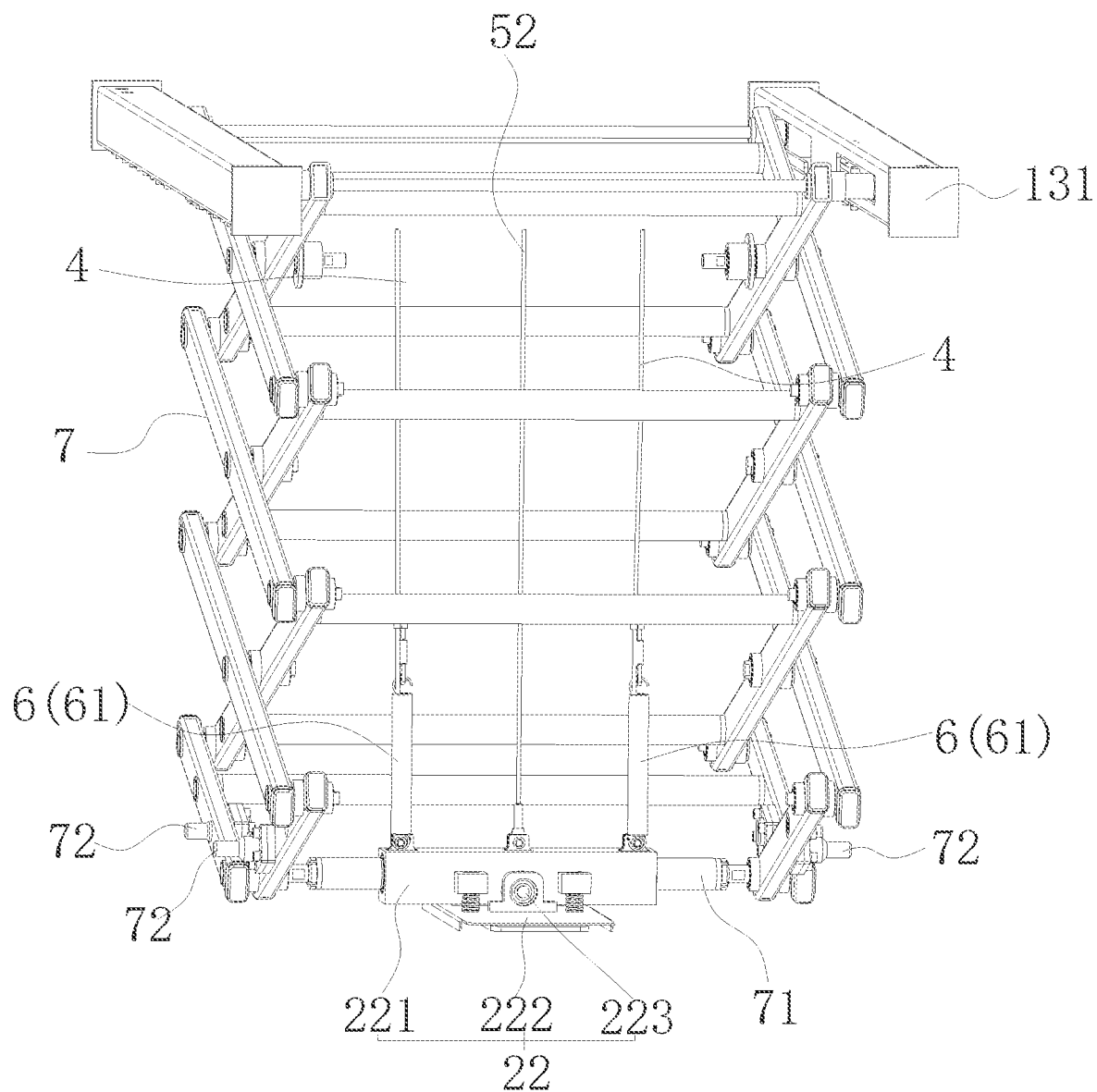
FIG. 9 is a schematic view of a structure of connection among the scissors mechanism, the cable, and a flexible swaying unit of the charging bow.
Figure 10:
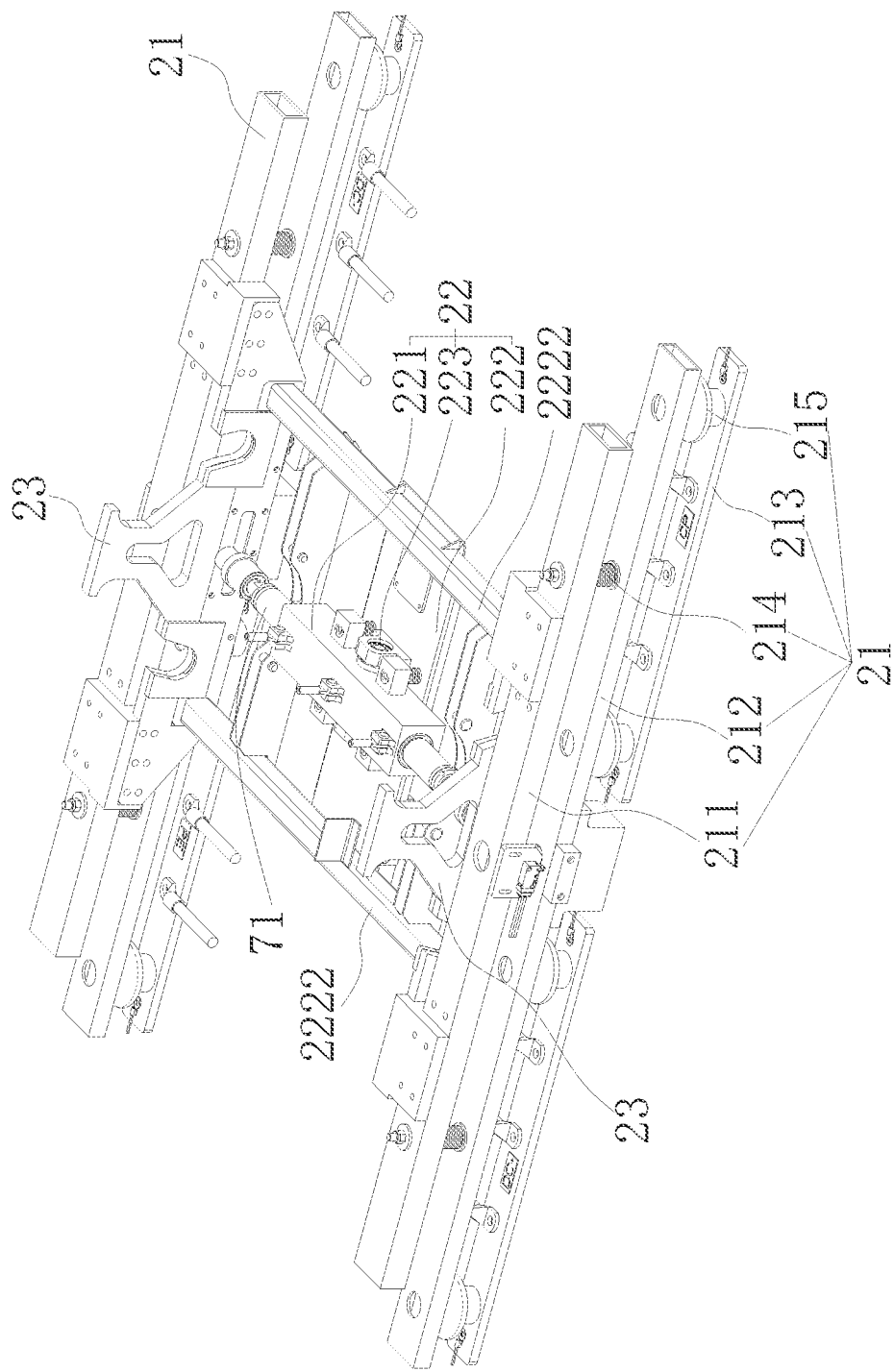
FIG. 10 is a schematic view of the structure of the charging bow.
Figure 11:
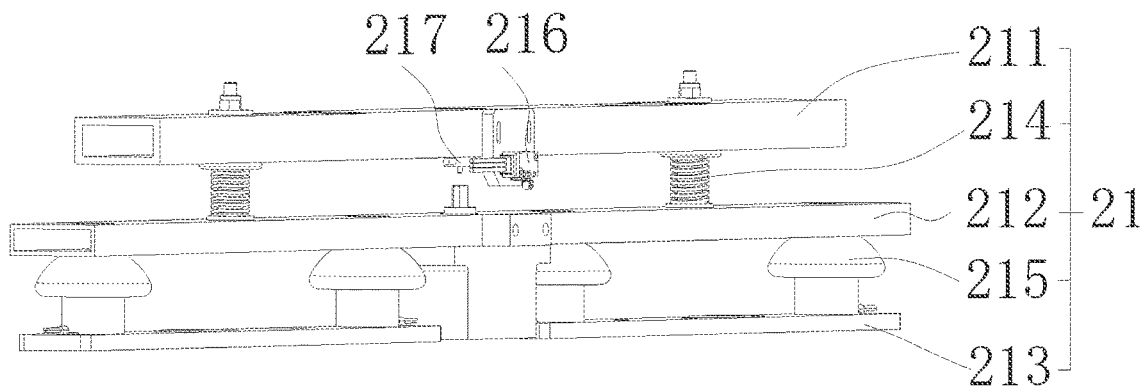
FIG. 11 is a schematic view a structure of a bow head assembly of the charging bow.
Figure 12:
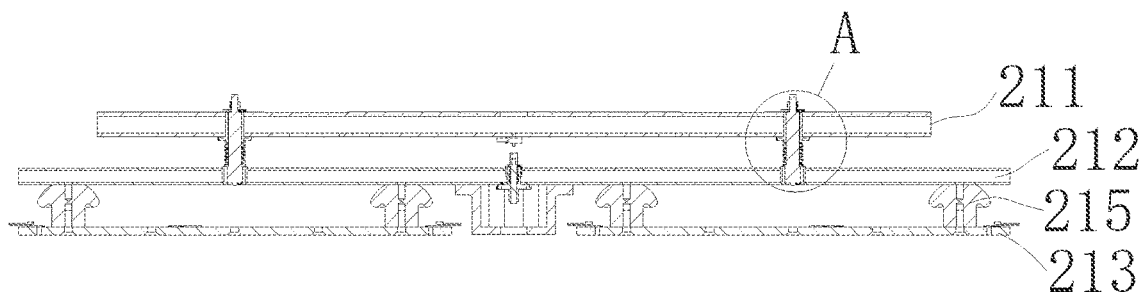
FIG. 12 is a cross-sectional view of the bow head assembly.
Figure 13:
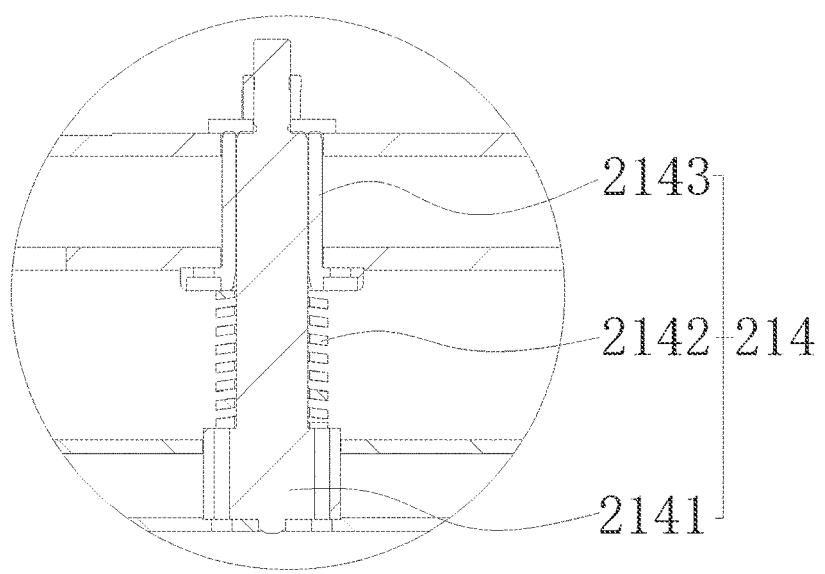
FIG. 13 is an enlargement view of a portion A of FIG. 12.
Figure 14:
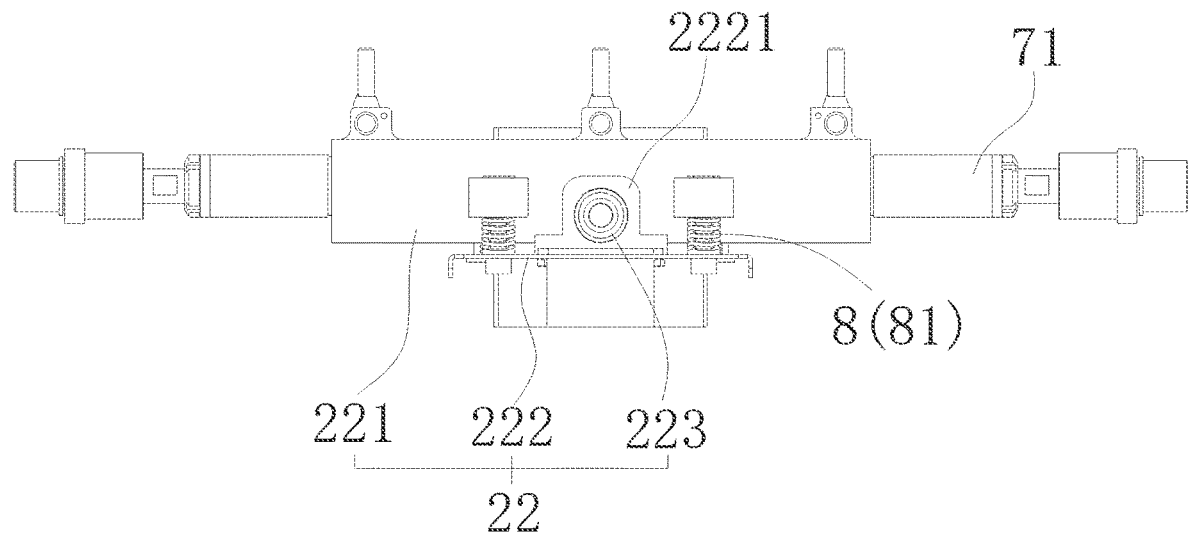
FIG. 14 is a schematic view a structure of the flexible swaying unit.
Figure 15:
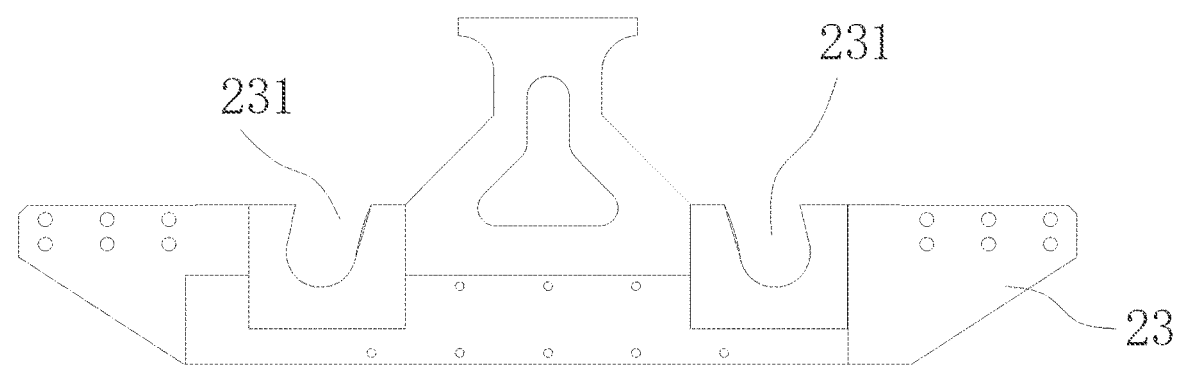
FIG. 15 is a schematic view a structure of a connecting plate.
Figure 16:
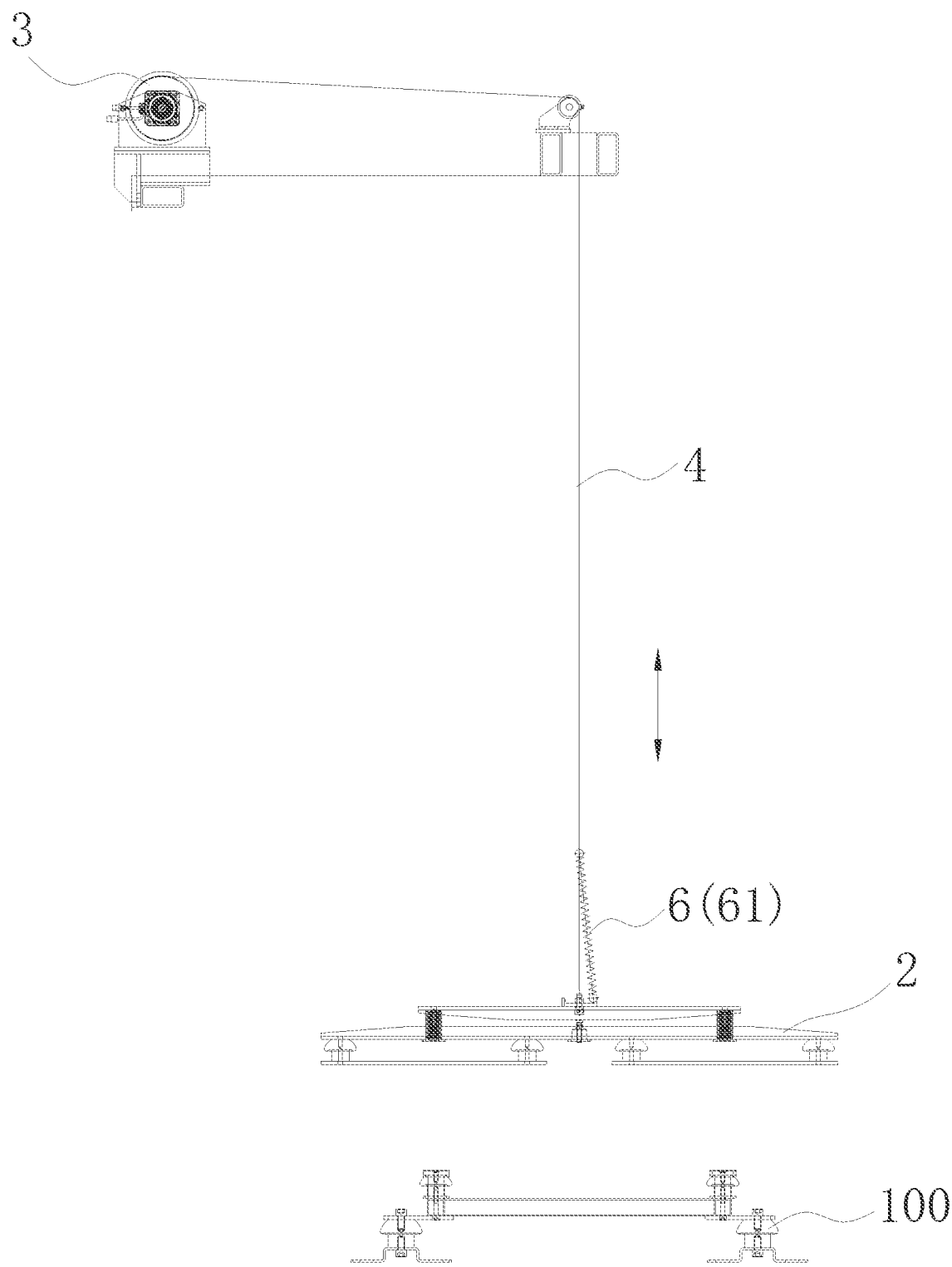
FIG. 16 is a view of a state in which the cable drives the charging bow to descend towards a pantograph when a straining member is an elastic member.
Figure 17:
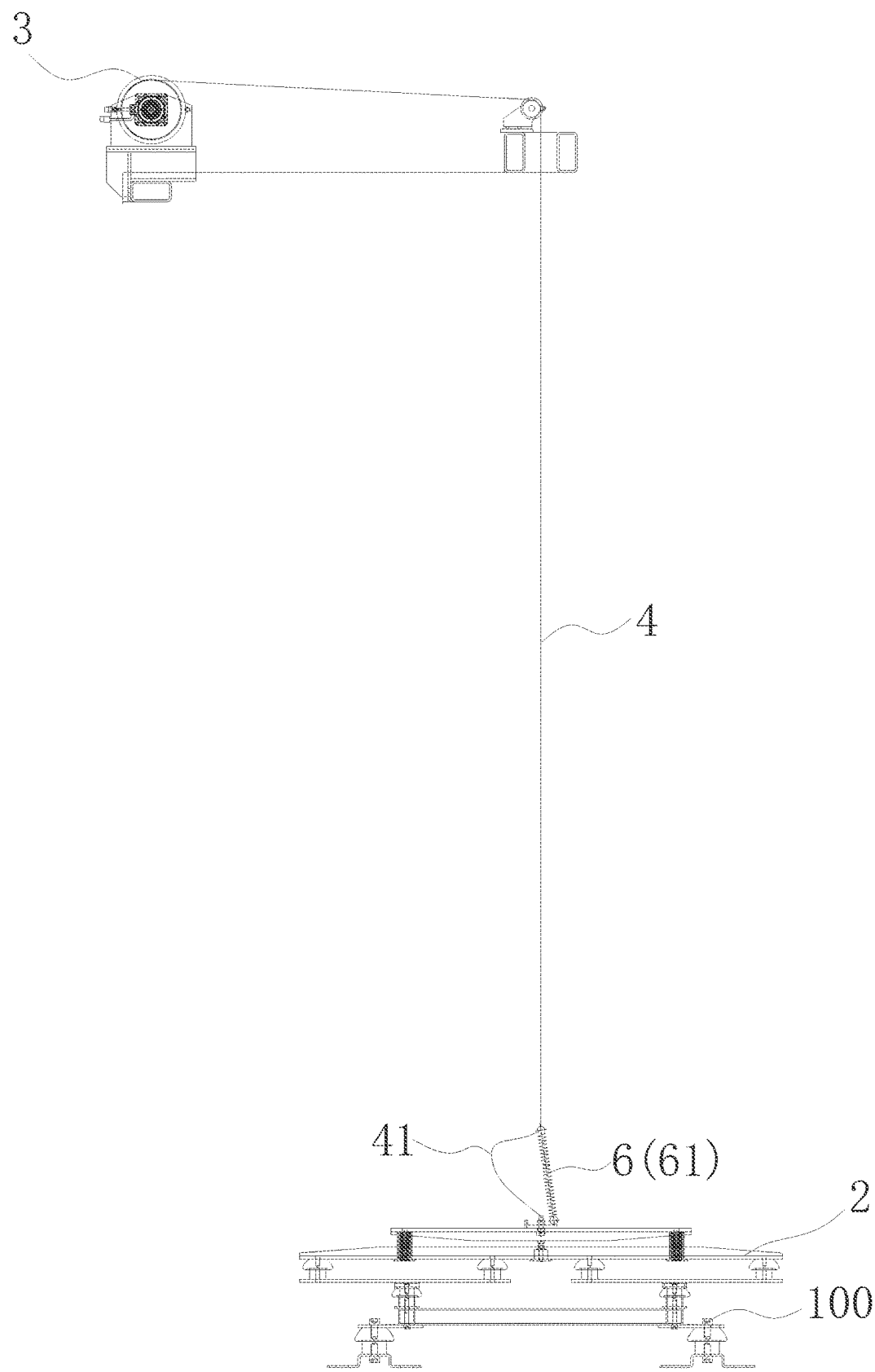
FIG. 17 is a view of a state after the charging bow and the pantograph are docked when the straining member is the elastic member.

Description will now be made in detail to clearly and completely present preferred embodiments of the disclosure, examples of which are illustrated in the accompanying drawings. Nevertheless, the disclosed embodiments are merely part of the embodiments of the disclosure, not all the embodiments. The following description of at least one exemplary embodiment is merely illustrative in nature and is in no way intended to limit the disclosure and its application or uses in any way. Based on the embodiments of the disclosure, all other embodiments obtained by a person having ordinary skill in the art without making any inventive effort fall within the scope that the disclosure seeks to protect.

It should be noted that the terminology used herein is for the purpose of describing the specific embodiments only, and is not intended to limit the exemplary embodiments according to the disclosure. As used herein, the singular forms are also intended to include the plural forms unless the context clearly dictates otherwise. In addition, it should also be understood that when the terms "comprising" and/or "including" are used in this specification, they indicate the presence of features, steps, operations, devices, components, and/or combinations thereof.

The relative arrangement of the components and steps, the numerical expressions, and numerical values set forth in these embodiments do not limit the scope of the disclosure unless specifically stated otherwise. Meanwhile, it should be understood that, for the convenience of description, the dimensions of various parts shown in the accompanying drawings are not drawn in an actual proportional relationship. Techniques, methods, and apparatuses known to a person having ordinary skill in the art may not be discussed in detail, but where appropriate, such techniques, methods, and apparatuses should be considered part of the authorized specification. In all examples shown and discussed herein, any specific value should be construed as illustrative only and not as limiting. Accordingly, other examples of exemplary embodiments may have different values. It should be noted that similar numerals and letters refer to similar items in the following figures. Therefore, once an element is defined in one figure, no further discussion of the element is required in subsequent figures.

In the description of the disclosure, it should be understood that the orientation or positional relationship indicated by the orientation words such as "front, rear, upper, lower, left, and right", "horizontal, vertical, particular, and parallel", and "top and bottom", etc., are usually based on the orientation or positional relationship shown in the drawings and are only for the convenience of describing the disclosure and simplifying the description. These orientation words do not indicate or imply that the referred device or element must have a particular orientation or be constructed and operated in a particular orientation, unless stated to the contrary. Therefore, it should not be construed as a limitation on the protection scope of the disclosure. The orientation words "inside and outside" refer to inside and outside relative to the contours of the components themselves.

For ease of description, spatially relative terms such as "on . . . ", "above . . . ", "on the upper surface of . . . ", "on top of . . . ", etc., may be used herein to describe the spatial positional relationship of one device or feature to other devices or features as shown in the drawings. It should be understood that spatially relative terms are intended to encompass different orientations of the device in use or operation in addition to the orientation depicted in the drawings. For instance, if a device in the drawings is turned upside down, the device described as "above other devices or structures" or "on other devices or structures" will then be positioned "below other devices or structures" or "under other devices or structures". Therefore, the exemplary term "above" can encompass both an orientation of "above" and "below". The device may also be positioned in other different ways (rotated 90 degrees or at other orientations), and the spatially relative descriptions used herein interpreted accordingly.

In addition, it should be noted that the use of words such as "first" and "second" to define components is only for the convenience of distinguishing corresponding components. Unless otherwise stated, the above words have no special meaning, and therefore cannot be construed as limiting the protection scope of the disclosure.

Embodiment One

As shown in FIG. 1 to FIG. 17, a charging apparatus provided by the disclosure includes a support unit 1 and a charging bow 2, and the charging bow 2 may be lifted and assembled on the support unit 1. When a vehicle is required to be charged, the charging bow 2 may be controlled to descend and be docked with a pantograph 100 on the vehicle for charging. After the charging is completed, the charging bow 2 may be raised to disconnect the connection with the pantograph 100.

The support unit 1 includes a column 11. A foundation embedded member 12 is formed at a lower end of the column 11 for stable connection with the ground. A beam 13 is formed on an upper end of the column 11, the beam 13 extends horizontally. The upper end of the column 11 is further connected to a pulling rod 14, and the pulling rod 14 is located above the beam 13. One end of the pulling rod 14 is connected to the column 11, and the other end of the pulling rod 14 is connected to the beam 13 to support the beam 13. The charging bow 2 is assembled on the beam 13.

The charging bow 2 is connected to the beam 13 through a scissors mechanism 7 and is driven by a cable 4 to ascend and descend. The scissors mechanism 7 can define ascending and descending directions of the charging bow 2 without any deviation in the horizontal direction. To be specific, a top end of the scissors mechanism 7 is slidably assembled on the beam 13. In order to facilitate the assembly of the scissors mechanism 7, a frame 131 is provided on the beam 13, a chute 1311 is formed on the frame 131, and the chute 1311 extends horizontally. Pulleys are formed at end portions of two scissor rods at the top end of the scissors mechanism 7. The two pulleys extend into the chute 1311 to move towards or to move away from each other to achieve the extension and retraction of the scissors mechanism 7. The cable 4 is connected to the charging bow 2 through the scissors mechanism 7. The cable 4 is a flexible pulling member such as a pulling rope and a flexible chain.

In a preferred technical solution of this embodiment, a guide plate 133 is also fixed on the frame 131, a guide groove 1331 is formed on the guide plate 133, and the extending direction of the guide groove 1331 is perpendicular to the extending direction of the chute 1311. A cross hinge shaft located in the middle of the scissors mechanism 7 may extend into the guide groove 1331 and slide along the guide groove 1331 to limit the telescopic direction of the scissors mechanism 7.

In a preferred technical solution of this embodiment, the cable 4 is retracted under the action of the retractable mechanism 3. A free end of the cable 4 is connected to the charging bow 2. When the retractable mechanism 3 retracts the cable, under the action of gravity, the charging bow 2 is lifted or lowered. The retractable mechanism 3 may selectively be a hoisting mechanism. The retractable mechanism 3 is disposed on the beam 13, and the frame 131 is provided with a wire pulley 132. The cable 4 is retracted under the action of the retractable mechanism 3 and then is connected to the charging bow 2 through the wire pulley 132. Preferably, at least two cables 4 are provided, and the at least two cables 4 are synchronously retracted under the action of the retracting mechanism 3 to pull the charging bow 2 up and down together.

In a preferred technical solution of this embodiment, each cable 4 is provided with and connected to a straining member, and the straining member 6 is connected to a mounting point of the cable 4 near the free end of the cable 4. When the retractable mechanism 3 releases the cable 4 to make the charging bow 2 descend and after the charging bow 2 and the pantograph 100 are docked, a section of the cable 4 may be continuously released, so that the cable 4 is in a relaxed state. The straining member 6 may provide a pulling force to the mounting point of the cable 4, so that the cable 4 between the mounting point and the retractable mechanism 3 is in a strained state, and the cable 4 between the mounting point and the charging bow 2 forms a cable slack section 41. That is, the slack cable is concentrated at one end close to the charging bow 2. In this way, the cable 4 may not be wound around, slipped out, or jammed at the retractable mechanism 3 or the wire pulley 132.

In this embodiment, the straining member 6 is configured to include an elastic member 61. One end of the elastic member 61 acts on the mounting point of the cable 4, and the other end of the elastic member 61 acts on the charging bow 2. To be specific, a connecting seat may be configured to be fixed on the charging bow 2, and the free end of the cable 4 is fixedly connected to the connecting seat. Hooks are formed at both ends of the elastic member 61, and a shackle is fixed to the mounting point of the cable 4. The hook at one end of the elastic member 61 hooks the shackle, and the hook at the other end of the elastic member 61 hooks the connecting seat. The free length of the elastic member 61 is less than the length of the cable between the mounting point and the charging bow 2. The elastic member 61 is optional but not limited to a spring.

Through arrangement of the elastic member 61, when the charging bow 2 is ascending or descending, the cable 4 is straightened, and the elastic member 61 is in a stretched state. When the charging bow 2 is crimped with the pantograph 100, under the action of the elastic member 61, the cable 4 between the mounting point and the charging bow 2 forms the cable slack section 41, such that the charging bow 2 downwardly floats and follows.

The charging bow 2 includes a bow head assembly 21 and a flexible swaying unit 22, and the bow head assembly 21 is connected onto the flexible swaying unit 22. The flexible swaying unit 22 is connected to a tail end of the scissors mechanism 7, and the cable 4 is connected to the flexible swaying unit 22.

The flexible swaying unit 22 includes a first swaying member 221 and a second swaying member 222. The first swaying member 221 is hinged on a hinge shaft 71 at the tail end of the scissors mechanism 7, and the second swaying member 222 is hinged to the first swaying member 221 through a rotating shaft. That is, the first swaying member 221 may drive the second swaying member 222 to sway together with the axis of the hinge shaft as the centerline, and the second swaying member 222 may sway relative to the first swaying member 221 with the axis of the rotating shaft as the centerline.

To be specific, the first swaying member 221 is rotatably sleeved on the hinge shaft 71, and the second swaying member 222 is located below the first swaying member 221. A lug 2221 extends from the second swaying member 222, the lug 2221 is hinged to the first swaying member 221 through the rotating shaft 223, and the axis of the rotating shaft 223 is perpendicular to but not intersecting with the axis of the hinge shaft 71. In this way, under the action of the flexible swaying unit 22, the bow head assembly 21 may sway in the front-rear direction and the left-right direction.

Two bow head assemblies 21 are provided. The two bow head assemblies 21 are connected to the flexible swaying unit 22, and the two bow head assemblies 21 are located on both sides of the lower end of the scissors mechanism 7. Each of the bow head assemblies 21 includes a primary support 211, a secondary support 212, and a bow head electrode 213. The primary support 211 is connected to the flexible swaying unit 22, the primary support 21 and the secondary support 212 are assembled together through a guide assembly 214, and the bow head electrode 213 is connected to the secondary support 212 through an insulator 215.

In a preferred technical solution of this embodiment, the guide assembly 214 includes a guide member 2141, a spring 2142, and a spring seat 2143. The guide member 2141 is fixedly assembled on the secondary support 212. The spring seat 2143 is assembled on the primary support 211, and the spring seat 2143 is sleeved on the guide member 2141 and may slide along the guide member 2141. A section of the guide member 2141 away from the secondary support 212 is connected to a limiting member, and the limiting member may prevent the spring seat 2143 from being detached from the guide member 2141. The spring 2142 is sleeved on the guide member 2141, and two ends of the spring 2142 act on the spring seat 2143 and the guide member 2141. When the primary support 211 compresses the spring 2142 and moves towards the secondary support 212, the downward crimping force of the secondary support 212 and the bow head electrode 213 thereon may be increased.

Preferably in this embodiment, each bow head assembly 21 is connected to the second swaying member 222 through the connecting plate 23. Two connecting plates 23 are provided, and the two connecting plates 23 are arranged corresponding to the two bow head assemblies 21. To be specific, the second swaying member 222 is fixedly connected to at least two connecting rods 2222, and the connecting rods 2222 are parallel to the hinge shaft 71 and extend to the two ends of the scissors mechanism 7. The two connecting plates 23 are symmetrically connected to two ends of the connecting rods 2222, and the connecting plates 23 are fixedly connected to the primary support 211. Preferably, limiting grooves 231 are formed on the connecting plates 23. Correspondingly, limiting rods 72 are formed on the two scissor rods at the tail end of the scissors mechanism 7, and the limiting rods 72 may extend into the limiting grooves 231 to move.

Further preferably, there are two limiting grooves 231 on the connecting plates 23, and the two limiting grooves 231 are symmetrically arranged. Under different positions of the scissors mechanism 7, the limiting rods 72 may slide in the limiting grooves 231 without interference. In addition, the connecting plates 23 may also rotate relative to the scissors mechanism 7 along the hinge shaft 71 and the rotating shaft 223. The limiting grooves 231 may be arranged within a certain inclination angle range, so that the connecting plates 23 and the scissors mechanism 7 may be yielded, and the bow head assembly 21 and the connecting plates 23 may be deflected within a certain inclination angle relative to the scissors mechanism 7 respectively with the axes of the hinge shaft 71 and the rotating shaft 223 as the deflection centerlines. Besides, the range of the inclination angle is also limited, so that the bow head assembly 21 and the connecting plates 23 are prevented from rotating significantly, and the collision between the structures and subsequent damage are prevented from occurring.

In a preferred technical solution of this embodiment, an in-position detection sensor 216 may be mounted on the primary support 211. The in-position detection sensor 216 may detect whether the crimping is in place, and specifically, a proximity switch may be used as the in-position detection sensor. A pressure sensor 217 may also be mounted between the primary support 211 and the secondary support 212, and the pressure sensor 217 may detect the crimping pressure. When the crimping pressure reaches the required value, the bow head assembly 21 may be stopped from descending.

In a preferred technical solution of this embodiment, in order to ensure that in the initial state, the two bow head assemblies 21 are in a balanced position, that is, the two bow head assemblies 21 are in the same horizontal position, a first elastic assembly 10 and a second elastic assembly 8 may be provided. At least one first elastic assembly 10 is provided, and each first elastic assembly 10 includes two first elastic members 101, and the two first elastic members 101 are symmetrically arranged. Both ends of each of the first elastic members 101 act on the scissors mechanism 7 and the primary support 211. Through arrangement of the first elastic assembly 10, the two bow head assemblies 21 may be kept horizontal in the left-right direction. At least one second elastic assembly 8 is provided, and each second elastic assembly 8 includes two second elastic members 81, and the two second elastic members 81 are symmetrically arranged on both sides of the rotating shaft 223. Both ends of each of the second elastic members 81 act on the first swaying member 221 and the second swaying member 222. Through arrangement of the second elastic assembly 8, the two bow head assemblies 21 may be kept horizontal in the front-rear direction. In this embodiment, two second elastic assemblies 8 are provided, and the two second elastic assemblies 8 are located on both sides of the first swaying member 221. The two second elastic members 81 of each of the second elastic assemblies 8 are symmetrical with respect to the rotating shaft 223. Preferably, each first elastic member 8 may be set as a tension spring, and each second elastic member 81 may be set as a compression spring.

In a preferred technical solution of this embodiment, in order to adjust the crimping force of the charging bow 2, a counterweight unit 5 is also provided. The counterweight unit 5 includes a counterweight member 51 and a counterweight cable 52, and the counterweight cable 52 passes through the wire pulley located on the beam 13. One end of the counterweight cable 52 is connected to the counterweight member 51, and the other end of the counterweight cable 52 is connected to the charging bow 2. To be specific, the counterweight cable 52 is connected to the middle of the first swaying member 221. The weight of the counterweight 51 is adjustable, and by adjusting the weight of the counterweight, the crimping force during charging may be adjusted within a reasonable range.

In addition, each bow head assembly 21 may also be provided with a distance detection sensor, a temperature detection sensor, and the like. By arrangement of the distance detection sensor, the distance from the bow head electrode 213 to the pantograph 100 of the vehicle may be detected to control the speed of lowering the bow, and the speed may also be reduced in advance and flexible connection is achieved when the bow head electrode 213 is in quick contact with the pantograph 100. Through arrangement of the temperature detection sensor, the temperature of the bow head electrode 213 may be detected, so as to prevent the temperature from rising excessively high and causing potential safety hazards.

Based on the above structure, the working process of the charging apparatus in this embodiment is as follows:

1. When charging is required, the retractable mechanism 3 releases the cable 4, and the charging bow 2 descends under the action of gravity.

2. The scissors mechanism 7 compresses or extends accordingly, and due to the guiding effect of the guide groove 1331, the charging bow 2 is always aligned with the pantograph 100 of the vehicle being charged during the descending process.

3. Through the distance detection performed on the charging bow 2, the speed of lowering the bow is controlled. When the bow head electrode 213 is in quick contact with the vehicle end electrode, deceleration is performed in advance, flexible connection is implemented, and whether in-position crimping is achieved is detected by the in-position detection sensor 216.

4. The retractable mechanism 3 continues to properly release the rope to maintain a certain length of slack. Due to the action of the first straining member 61, the cable slack section 41 is formed between the mounting point of the cable 4 and the charging bow 2. In this way, it can be ensured that the charging bow 2 and the pantograph 100 are completely crimped, and when the vehicle is floated, the bow head assembly 21 downwardly floats and follows.

5. The charging starts, and after the charging is completed, the bow is raised according to the specified requirements of the control.

6. Deceleration and shutdown detection are performed during the bow raising process as well to achieve flexible bow raising and to finally return to the initial standby position.

Embodiment Two

Figure 18:
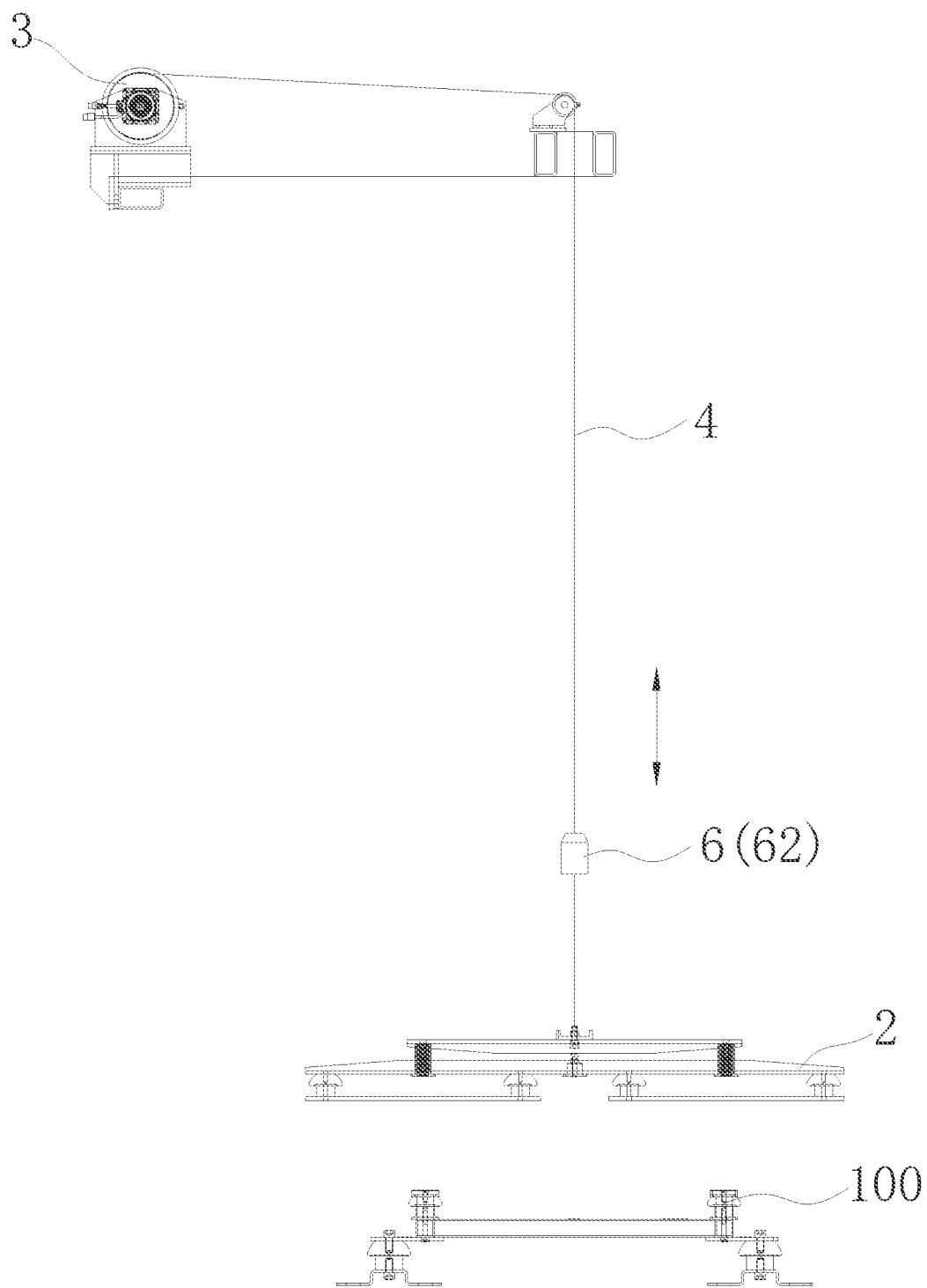
FIG. 18 is a view of a state in which the cable drives the charging bow to descend towards the pantograph when the straining member is a weight.
Figure 19:
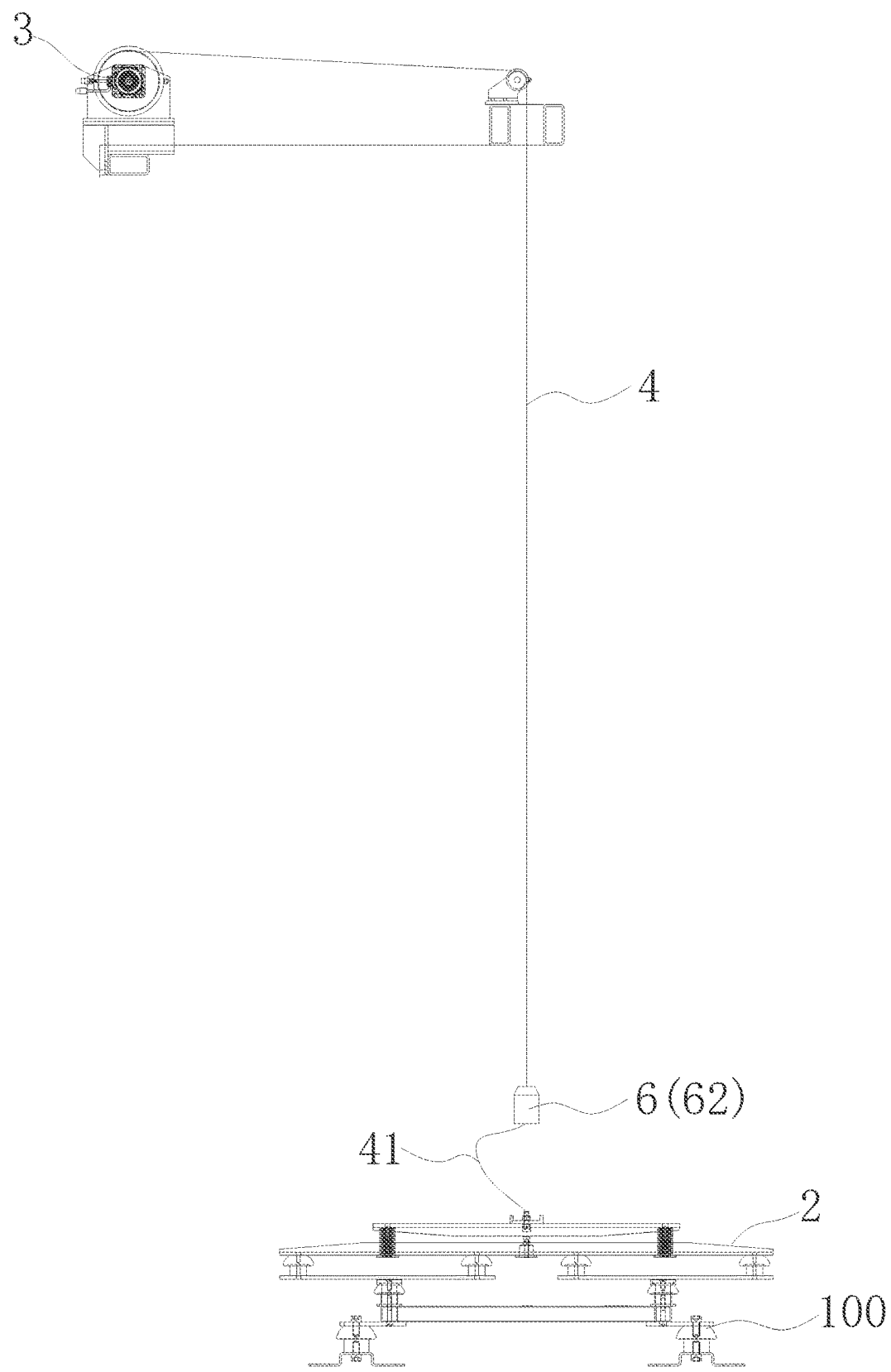
FIG. 19 is a view of a state after the charging bow and the pantograph are docked when the straining member is the weight.

As shown in FIGS. 18 to 19, this embodiment is basically the same as the first embodiment, and the difference is that the structure of the straining member 6 is different. In this embodiment, the straining member 6 includes a weight 62, and the weight 62 is connected to the mounting point of the cable 4 near the charging bow 2.

When the charging bow 2 is ascending or descending, the cable 4 is straightened. When the charging bow 2 and the pantograph 100 are crimped, the retracting mechanism 3 continues to properly release the rope, so that the cable 4 is provided with a certain length of slack. Under the action of the weight 62, the cable 4 between the mounting point and the charging bow 2 forms the cable slack section 41, such that the charging bow 2 downwardly floats and follows.

Embodiment Three

Figure 20:
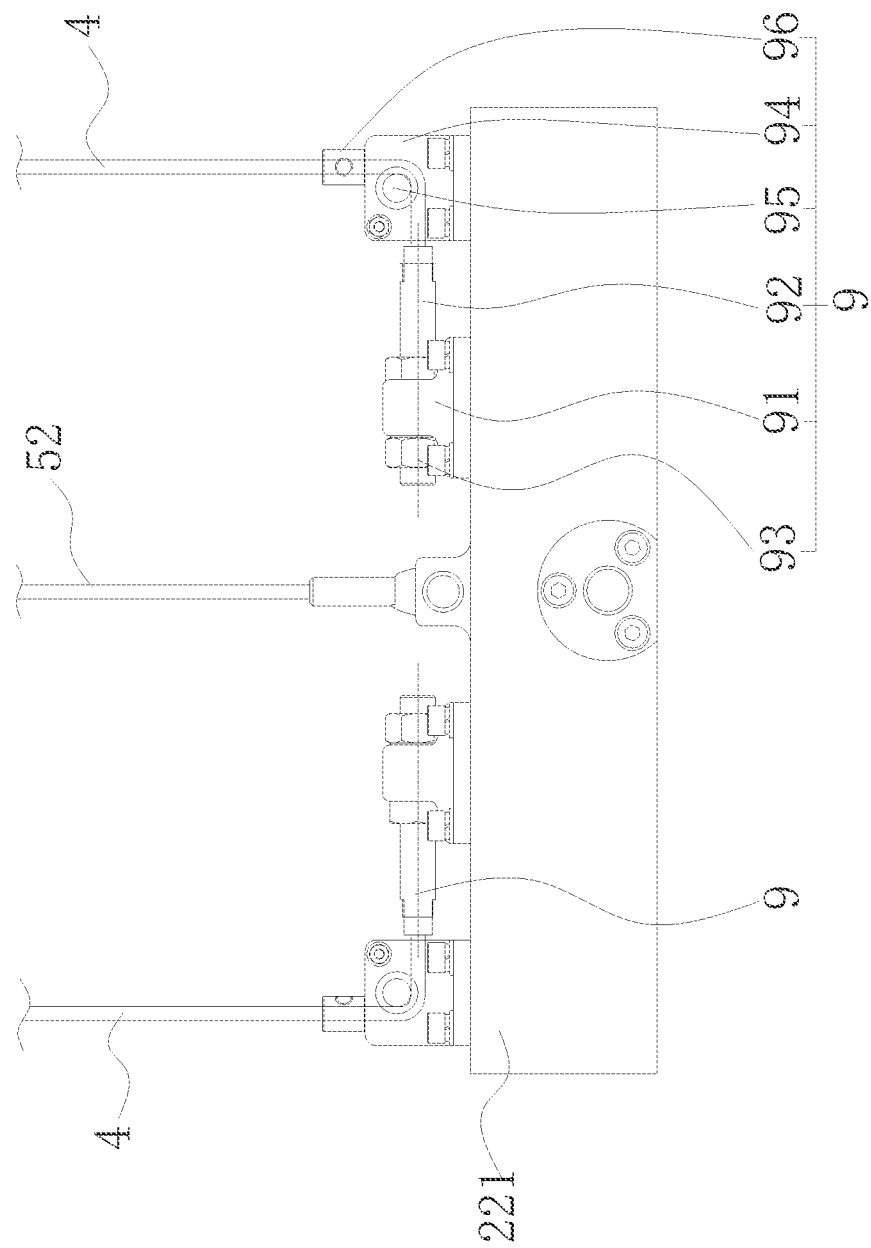
FIG. 20 is a schematic view of a structure of the cable connected to the flexible swaying unit through a tensioning mechanism.

As shown in FIG. 20, this embodiment is basically the same as the foregoing two embodiments, and the difference is that the cable 4 is connected to the flexible swaying unit 22 through a tensioning mechanism 9. The tensioning mechanism 9 is fixedly assembled on the flexible swaying unit 221 of the flexible swaying unit 22. In this way, on the one hand, the function of the connecting seat may be provided, and on the other hand, the tension of the cable 4 may be adjusted.

To be specific, the tensioning mechanism 9 is provided corresponding to the cable 4. and the tensioning mechanism 9 includes a tensioning seat 91, an adjusting screw 92, a locking member 93, a steering seat 94, and a steering shaft 95. The tensioning seat 91 and the steering seat 94 are fixed onto the first swaying member 221. The adjusting screw 92 is threadedly assembled on the tensioning seat 91, the steering shaft 95 is disposed on the steering seat 94, and the free end of the cable 4 is connected to the adjusting screw 92 after changing direction through the steering shaft 95. Preferably, the cable 4 is fixedly connected to one end of the adjusting screw 92 after the direction of cable 4 is changed vertically through the steering shaft 95.

After the adjusting screw 92 adjusts the cable 4 in place, the position of the adjusting screw 92 on the tensioning seat 91 may be locked by the locking member 93. Preferably, the locking member 93 is optional but not limited to a locking nut. Two locking members 93 may be provided, and the two locking members 93 may lock the adjusting screw 92 from both ends of the adjusting screw 92.

In a preferred technical solution of this embodiment, the steering seat 94 is further provided with a stop buckle 96. After passing through the stop buckle 96, the cable 4 enters the steering seat 94 and then is connected to the adjusting screw 92. Through arrangement of the stop buckle 96, the cable 4 at the stop buckle 96 may be limited, and the cable 4 cannot move relative to the stop buckle 96. When the tension of the cable 4 needs to be adjusted, the stop buckle 96 may be unlocked, and the adjusting screw 92 may pull the cable 4 to move relative to the stop buckle 96. Through arrangement of the stop buckle 96, there is no slack in the cable 4 between the tensioning seat 91 and the steering seat 94.

In a preferred technical solution of this embodiment, when the straining member 6 includes the elastic member 6, the hook body of the elastic member 61 may be hooked on the steering seat 94.

The embodiments of the disclosure have been described in detail above with reference to the accompanying drawings, but the disclosure is not limited to the abovementioned embodiments. Various changes may be made without departing from the spirit of the disclosure within the scope of knowledge possessed by a person having ordinary skill in the art.

What is claimed is:

1. A charging apparatus, comprising:
   a support unit;
   a charging bow, lifted and assembled on the support unit;
   a retractable mechanism, wherein the retractable mechanism retracts a cable, and a free end of the cable pulls the charging bow up and down; and
   a straining member, assembled on a mounting point of the cable near the free end, wherein the retractable mechanism continues to release the cable to relax the cable after the charging bow is docked with a pantograph, the cable between the mounting point and the retractable mechanism is in a strained state under the action of the straining member, and the cable between the mounting point and the charging bow forms a cable slack section.

2. The charging apparatus according to claim 1, wherein the straining member comprises an elastic member, one end of the elastic member acts on the mounting point, and the other end of the elastic member acts on the charging bow, or the straining member comprises a weight, and the weight is fixed at the mounting point of the cable.

3. The charging apparatus according to claim 1, further comprising a scissors mechanism, wherein the scissors mechanism is telescopically assembled on the support unit, a lower end of the scissors mechanism is connected to the charging bow, and the cable passes through the scissors mechanism and is connected to the charging bow.

4. The charging apparatus according to claim 3, wherein a chute and a guide groove are formed on the support unit, a top end of the scissors mechanism is slidably assembled into the chute, and a cross hinge shaft of scissor rods of the scissors mechanism slides along the guide groove.

5. The charging apparatus according to claim 3, wherein at least two cables are provided, and the free end of each of the cables is connected to the charging bow through a tensioning mechanism, and the tensioning mechanism comprises:
   a tensioning seat, fixedly assembled on the charging bow;
   an adjusting screw, arranged for the cable, wherein the adjusting screw is threadedly assembled on the tensioning seat, and the adjusting screw is fixedly connected to the free end of the cable;
   a locking member, configured to lock the position of the adjusting screw on the tensioning seat; and
   a steering seat, fixedly assembled on the charging bow, wherein a steering shaft is disposed on the steering seat, and the cable is connected to the adjusting screw after changing direction through the steering shaft.

6. The charging apparatus according to claim 3, wherein the charging bow comprises a bow head assembly and a flexible swaying unit, and the bow head assembly is connected onto the cable through the flexible swaying unit.

7. The charging apparatus according to claim 6, wherein the flexible swaying unit comprises a first swaying member and a second swaying member, the first swaying member is hinged to a tail end of the scissors mechanism, the second swaying member is hinged to the first swaying member, and a swaying centerline of the first swaying member relative to the scissors mechanism and a swaying centerline of the second swaying member relative to the first swaying member are perpendicular to each other.

8. The charging apparatus according to claim 7, wherein a first elastic assembly is formed between the scissors mechanism and the charging bow, the first elastic assembly is symmetrically arranged with respect to the scissors mechanism, and/or a second elastic assembly is formed between the first swaying member and the second swaying member, and the second elastic assembly is symmetrically arranged with respect to the swaying centerline of the first swaying member relative to the second swaying member.

9. The charging apparatus according to claim 6, wherein the bow head assembly is connected to the flexible swaying unit through connecting plates, the connecting plats are located on two sides of the tail end of the scissors mechanism, limiting grooves are formed on the connecting plates, limiting rods are formed on the scissors mechanism, and the limiting rods extend into the limiting grooves to limit a swaying angle of the bow head assembly relative to the scissors mechanism.

10. The charging apparatus according to claim 1, further comprising a counterweight unit, wherein the counterweight unit comprises a counterweight member and a counterweight cable, and the counterweight member acts on the charging bow upwards through the counterweight cable.

11. The charging apparatus according to claim 7, wherein the bow head assembly is connected to the flexible swaying unit through connecting plates, the connecting plats are located on two sides of the tail end of the scissors mechanism, limiting grooves are formed on the connecting plates, limiting rods are formed on the scissors mechanism, and the limiting rods extend into the limiting grooves to limit a swaying angle of the bow head assembly relative to the scissors mechanism.

12. The charging apparatus according to claim 8, wherein the bow head assembly is connected to the flexible swaying unit through connecting plates, the connecting plats are located on two sides of the tail end of the scissors mechanism, limiting grooves are formed on the connecting plates, limiting rods are formed on the scissors mechanism, and the limiting rods extend into the limiting grooves to limit a swaying angle of the bow head assembly relative to the scissors mechanism.

* * * * *